Patented Oct. 30, 1945

2,387,931

UNITED STATES PATENT OFFICE 2,387,931

UNSATURATED ESTERS AND POLYMERS THEREOF

Irving E. Muskat and Franklin Strain, Akron, Ohio, assignors to Pittsburgh Plate Glass Company, Allegheny County, Pa., a corporation of Pennsylvania No Drawing. Application May 6, 1941,
Serial No. 392,100

8 Claims. (Cl. 260—78)

This invention relates to novel compositions of matter and to the polymerization products which may be prepared from such compositions. In accordance with the present invention, we have discovered a novel class of compounds which are complex esters of an esterified hydroxy acid (preferably an unsaturated alcohol ester of an hydroxy carboxylic acid) wherein an hydroxy group of the hydroxy acid is esterified with an acid ester of a polybasic acid and an unsaturated alcohol. Many of these esters may be polymerized to form polymers having desirable characteristics or they may be used for various other purposes, such as plasticizers, solvents, insecticides, etc.

The invention includes esters of various polybasic acids such as carbonic acid esters, which may be formed by the reaction of an ester of an hydroxy acid with a chloroformate of a suitable alcohol and esters of other polybasic acids which may be prepared by reaction of acid esters thereof or salts of such acid esters with the esterified hydroxy acid or with esters of halogen substituted acids respectively. Thus, esters derived from various polybasic acids such as diglycolic, dilactic or other acids derived by oxidation of the carbinol groups of di-, tri-, tetra-, or other polyglycol including the polyglycols of ethylene, propylene, and butylene; cyanuric, oxalic, maleic, phenyl malonic, fumaric, dimethyl maleic, tartaric, tartronic, succinic, malonic, phthalic, glutaric, adipic, pimelic, sebacic, tricarballylic, itaconic, mesaconic, citraconic, citric, malic, terephthalic, acetylene dicarboxylic or other polybasic or polycarboxylic acids such as sulphuric, sulphurous, phosphorous, phosphoric, boric, silicic, or chromic acids, etc., are contemplated in accordance with the present invention.

The invention is applicable to esters of numerous hydroxy carboxylic acids such as glycolic, lactic, alpha, beta or gamma hydroxy butyric, citric, m or p hydroxy benzoic, malic, hydroxy valeric, hydroxy fumaric, hydroxy cinnamic, salicylic, hydroacrylic, mandelic, glyceric, alpha hydroxy vinyl acetic, hydroxy caproic, ricinoleic, tartaric, mucic, glyconic, resorcylic, or other mono- or polyhydroxy carboxylic acid or other hydroxy acid, preferably those wherein the hydroxyl and the carboxyl groups are linked to the same carbon chain or to carbon chains which are separated only by an ether linkage.

The invention is particularly related to the esters of unsaturated alcohols which contain an unsaturated group in an aliphatic chain and not in excess of 10 carbon atoms such as vinyl, allyl, isopropenyl or other propenyl esters, methallyl, methyl vinyl carbinyl, or crotyl or other butenyl ester or α or β ethyl allyl or other pentenyl ester or esters of other alcohols including tiglyl, butadienyl, propargyl, cinnamyl, angelyl, linalyl or geranyl alcohols or halogenated alcohols such as 2-chlorollayl, or chlorocrotyl alcohols, etc. Of particular interest are the esters of alcohols containing up to 5 carbon atoms such as the vinyl, propenyl, butenyl and pentenyl esters.

The complex esters herein contemplated may be prepared by numerous other methods. For example, carbonic acid esters may be prepared by reaction of a haloformate such as allyl, methallyl, crotyl, butadienyl, or other chloroformates, bromoformates, etc., with an ester of the desired hydroxy acid. Generally, this reaction may be conducted in the presence of a suitable basic agent such as pyridine, quinoline, dimethyl aniline, or carbonate, bicarbonates, or hydroxides of sodium, potassium, calcium, magnesium, barium or strontium, quaternary ammonium bases, or other alkaline agent. Water or nonaqueous diluents such as acetone or dioxane may be utilized in order to assist the reaction, if desired. Inhibitors such as hydroquinone may be utilized to prevent polymerization during formation of the ester.

The esters prepared in accordance with the present invention may be recovered from the reaction mixture by distillation, preferably after removal of pyridine hydrochloride, if present. However, since many of these materials are high boiling point liquids or solids, distillation is often difficult. Accordingly, the esters are often purified by washing the reaction mixture with water and drying the ester or a nonaqueous solution of the ester with a dehydrating agent such as calcium chloride.

The compounds thus obtained in the case of the carbonic esters have the following chemical formula:

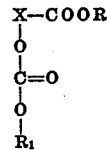

Where R and $R_1$ are unsaturated radicals and X is an organic radical such as a hydrocarbon or substituted hydrocarbon radical, in which the oxygen is linked directly to a carbon atom. Thus, esters may be prepared by reacting allyl or other unsaturated chloroformate with an allyl or other unsaturated ester of an hydroxy acid. For example, allyl, methallyl, or crotyl chloroformate may be reacted with allyl, methallyl, or crotyl lactate. As an alternative method, the lactic or other hydroxy acid may be treated with allyl or other chloroformate and may be subsequently esterified with a suitable alcohol such as methyl, allyl, or methallyl alcohol or glycol or alternatively, lactic acid esters may be treated with phosgene to form the corresponding chloroformate or haloformate and the product thus formed treated with an alcohol. Similar polyunsaturated esters of other hydroxy acids such as those mentioned above may be prepared by the methods herein mentioned.

Esters of polybasic acids other than carbonic acid may be prepared by various methods. For example, the partial esters of these acids may be reacted directly with esters of the hydroxy acid. Alternatively, they may be prepared by reacting salts of the partial ester of a polybasic acid with esters of halogen substituted acids. For example, the silver, sodium, or potassium salt of monoallyl or monomethallyl or other mono unsaturated phthalate may be reacted with vinyl or allyl or other chloroacetate, chloropropionate, bromoacetate, etc.

In accordance with a further modification, complex esters of hydroxy acids and polyhydric or polyamino compounds may be secured. For example, the polylactates of polyhydric alcohols or polyamines such as glycol dilactate, glycerol di- or trilactate, or the corresponding amides may be prepared and treated with a suitable chloroformate such as allyl or methallyl chloroformate to react with the hydroxy group of the acid radical and thereby to form a carbonate ester or other esters of a polybasic acid may be formed by the treatment of these polyesters as described above.

Numerous derivatives of polybasic acids containing three or more acidic groups may be prepared. For example, diallyl acid phosphate or diallyl acid citrate, or the corresponding allyl, allyl methyl, allyl lauryl, allyl cetyl, acid esters or other unsaturated-saturated mixed esters or other partia esters of an acid such as phosphoric, citric, benzene tri- or tetra carboxylic acids, etc., particularly those which have been esterified with at least two moles of alcohol and which contain at least one unsaturated ester group may be reacted with the lactate ester. Alternatively, the corresponding alkali metal or silver salts of these acids such as chloracetic, bromacetic, chloropropionic, esters, etc. Other products may be secured by reaction of the esters of halogen substituted acids with salts of partial esters of polybasic acids such as sodium allyl phthalate or sodium methallyl phthalate. In accordance with a further modification, other mixed esters may be secured by formation of a polychloroformate or polybromoformate of glycol or glycerol, diethylene glycol or other polyhydric alcohol and reacting the resulting polychloroformate or polybromoformate with an ester of lactic, glycolic, or other hydroxy acid.

The esters herein contemplated are generally non-resinous in character and are definite compounds usually capable of being isolated in a substantially pure state. In order to avoid the formation of excessively complex molecules, it is generally desirable to avoid the production of esters from compounds wherein more than one available functional group is present in both the ester of the hydroxy acid and the polybasic acid. By this means, only one mole of the hydroxy acid will be linked to the polybasic acid radical or alternatively, only one mole of the polybasic acid should be linked to the ester of the hydroxy acid.

For example, if an ester of a di- or polyhydroxy acid such as allyl tartrate is to be treated, the ester of the polybasic acid should contain but one available functional group. Thus, diallyl tartrate may be reacted with allyl chloroformate, allyl acid phthalate, allyl acid maleate, diallyl acid citrate, monomethyl monoallyl acid citrate, sodium allyl acid citrate, etc. Similarly, if an acid containing more than one available functional group such as monoallyl, monomethallyl or monovinyl citrate is used to form the ester, then only esters of hydroxy acids containing a single free hydroxyl group is used.

It will thus be seen that the esters so prepared are esters of (a) an hydroxy carboxylate and (b) an acid ester of an unsaturated alcohol and a polybasic acid wherein either (a) or (b) or both contain but one functional group (acid or alcohol) which is available for this esterification. It is of course clear that such materials may be prepared from compounds containing more than one functional group provided not all of the functional groups are available. Thus, a monoester of a tribasic acid may be reacted with an ester of a dihydroxy carboxylic acid if the reactivity of the acid groups is such that one of the acid groups takes no substantial part in the reaction. For example, an acid containing two functional groups such as monosodium monoallyl acid citrate may be reacted with vinyl chloroacetate to form a corresponding ester containing a free functional (acid) group which was not available for the reaction. Likewise, the allyl ester of αβ anhydrotricarballylic acid may be reacted with a dihydroxy acid or ester thereof to form an ester containing free acid groups which may be considered to be unavailable. Moreover, the groups may be blocked in order to prevent reaction by suitable means. Thus, excess hydroxy groups may be etherified or esterified while excess acid groups may be neutralized with monobasic alcohols or with bases.

The formation of the carbonate esters is generally accomplished by conducting the treatment of the chloroformate with the desired hydroxy compound in the presence of a basic agent such as trimethyl phenyl ammonium hydroxide, or inorganic bases such as the oxides, hydroxides, and carbonates of sodium, potassium, calcium, barium, strontium, and magnesium or other alkaline earth metal, or alkali metal. The basic agent may be in solution or may be dispersed as a finely pulverized solid material. Thus, finely divided calcium carbonate has been found to be especially effective.

Water may be present or the reaction may be conducted under substantially anhydrous conditions. It may, under some circumstances, be desirable to add diluents, such as water, acetone, carbon tetrachloride or dioxane.

The temperature of the reaction will depend upon the nature of the basic reagent used. When pyridine or caustic soda is used, temperatures less than normal room temperature (15–25° C.) may be used. The lower temperatures generally favor higher yields. When calcium carbonate is used as the basic reagent it is desirable to operate at higher temperatures, preferably above 50° C. The effect of reduced yields can be compensated by controlling the concentration of reactants. Thus, by using an excess of both alcohol and a basic reagent, almost quantitative yields can be obtained in many cases. When operating under such circumstances the excess of reagents may be recovered and used in subsequent preparations.

The compositions herein described vary from high boiling point liquids to solids. Many of the liquids are very clear and colorless and are miscible with numerous organic solvents, such as acetone, alcohol, chloroformate, dioxane, benzene, toluene, xylene, ethyl ether, paraffin hydrocarbons, etc.

These compositions may be used for many purposes such as solvents, paint compositions, pharmaceuticals, plasticizers, etc. for various materials such as cellulose, vinyl, urea, phenol, acrylic or styrene resins or plastics. Many of the new esters, particularly the polyunsaturated esters, polymerize in the presence of catalysts such as heat, light, oxygen, ozone; peroxides such as benzoyl or lauryl peroxides, etc. In most cases where the monounsaturated esters polymerize, the polymers thereof are fusible and soluble in common organic solvents and often these materials polymerize only with difficulty, forming viscous oils or soft solids. By polymerization of the polyunsaturated esters, however, it is possible to secure a wide range of polymers, some of which are extremely hard, while others are soft and flexible in character. In general, the polymers thus obtained are transparent and colorless, although the polymer occasionally may be slightly yellow. If desired, the compounds herein described may be cast polymerized to form products having various shapes. These polymers in their finally cured state are substantially infusible and insoluble and, in general, are substantially unaffected by acids, alkalies, water or organic solvents. Many of the products obtained by polymerization of the materials herein contemplated are tougher and more resistant to shattering than are many of the polymers of allyl esters of polybasic acids.

In accordance with the present invention, intermediate polymers of the polyunsaturated esters may be prepared. These intermediate products may be soluble and fusible, or if desired, intermediate polymers having a gel-like structure and containing more or less insoluble polymer may be secured. These polymers may be obtained by interrupting polymerization at the proper time.

In general, the fusible soluble polymers are soluble in various organic solvents such as acetone, carbon tetrachloride, benzene, xylene, toluene, dioxane, etc. Both types of these intermediates may be further polymerized to an infusible state to form products similar to the infusible polymers mentioned above. Thus, these fusible polymers may be molded or otherwise shaped and polymerized by means of heat and/or light to form shaped products which are substantially infusible and insoluble and which retain their shape permanently.

The soluble fusible polymers herein described may be prepared by polymerizing the unsaturated compounds which contain at least two polymerizable unsaturated groups until substantial polymerization has occurred and interrupting polymerization before the polymer is converted into an infusible polymer, preferably while the polymer remains viscous. It is found that when polymerization of these materials is initiated, a fusible polymer is preliminarily formed. As polymerization proceeds, the monomer-polymer mixture is converted into a gel which contains a substantial portion of insoluble polymer. Upon further polymerization the gel is further converted to a tougher, more abrasion-resistant polymer which may in some cases be substantially infusible. By interrupting polymerization before the polymer is converted to a gel and while the polymer is viscous, it is possible to obtain a fusible polymer. This interruption may be effected by cooling, addition of inhibitors, or by other methods. If desired, the fusible polymer may be recovered substantially free of monomer or at least as a concentrate containing substantially less monomer than is present in the monomer-polymer mixture formed by ordinary polymerization of undiluted monomer.

The fusible polymer may be obtained by polymerization of the monomeric compound or a solution thereof. In general, it is possible to secure the fusible material in superior yields by polymerizing the monomer in a solution in which the fusible polymer is normally soluble and interrupting polymerization before the polymer is converted into a gel. This polymer is generally soluble in the solvents which are capable of dissolving the usual thermoplastic vinyl or acrylic resins such as polymethyl methacrylate or polyvinyl acetate. Thus, such solvents as acetone, dioxane, chloroform, toluene, benzene, carbon tetrachloride, methyl cellosolve acetate, phenyl cellosolve, dichlorethyl ether, xylene, tetralin, dibutyl phthalate, trichlorethylene, tetrachlorethane, etc., or mixtures of these solvents generally are found to be suitable. Solutions having concentrations of 10 to 60 percent of monomer yield very satisfactory results.

In any case the polymerization may be interrupted before the infusible product is produced. This may be accomplished by stopping polymerization as the mixture of monomer and polymer begins to grow viscous and before gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the materials are polymerized in solution. Polymerization may also be halted by lowering the temperature of the reaction mixture to a suitable degree, for example, to room temperature or below. In accordance with another effective method of interrupting polymerization, inhibitors such as pyrogallol, hydroquinone, aniline, phenylene diamine or sulphur may be added to the polymer during polymerization or before polymerization has been initiated.

In polymerization of the compounds herein contemplated, the time required in order to initiate polymerization and to secure a fusible polymer varies widely in view of slight traces of peroxides or inhibitors which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to two hours is sufficient, although some compounds polymerize somewhat more slowly.

The fusible polymer produced by polymerization of diluted or undiluted monomer may be molded or cast to any desired shape and subsequently cured to the infusible state. In treatment many of these materials, however, it is found that if considerable monomer is retained in the polymer, considerable difficulty may be encountered upon curing in securing complete or substantially complete polymerization of the residual monomer without formation of undesirable soft products or of products containing cracks, bubbles, and other defects. Accordingly, we have found that, in many cases, it is desirable to remove all or a portion of such monomer from the polymer prior to curing the polymer to its infusible state. In accordance with one convenient method, the polymer may be separated by addition of a nonsolvent such as water, ethyl or methyl alcohol, glycol, etc. Alternatively, the monomer and/or solvent may be distilled from the polymer under conditions whereby further polymerization is minimized, for example, by distillation in a vacuum, preferably at low temperatures, and/or in the presence of added inhibitors. When the polymer is semi-solid or solid, the product may be dispersed or extracted with a suitable solvent for the monomer in which the polymer is insoluble, such as methyl or ethyl alcohol. Additionally, the polymer and monomer may be separated by dissolving the product in a solvent for both monomer and polymer and adding a nonsolvent to precipitate the fusible polymer.

As previously noted, we have found that upon subjection of these fusible polymers to heating at temperatures somewhat above the softening point thereof, for a sufficient period of time, they are converted into infusible, insoluble, transparent, hard and wear-resistant products. This conversion is preferably assisted by the incorporation of usual polymerization catalysts, such as oxygen, ozone, air, peroxides such as hydrogen peroxide or benzoyl or lauryl peroxide, or other oxygen catalyst, basic or acidic catalyst, light, etc.

The resins herein contemplated are suitable for many uses in the field of impregnated or laminated products. For example, products of great strength, elasticity, and adherence may be secured by impregnating fibrous sheets of paper, linen, canvas, etc., with the monomer or fusible polymer herein described, forming a laminated product and curing the same to an infusible state. Leather, paper, wood, or other comparatively porous substances may be steeped in a solution of the fusible polymer and one or more layers heated under pressure, generally in the presence of catalyst, to convert the absorbed polymer to the infusible, insoluble form. Greatly improved products, particularly in regard to strength, waterproofing and electrical properties are obtained.

In preparing laminated products it is also possible to impregnate sheets with monomer or syrupy polymer and thereafter to polymerize these sheets to a stage where it is substantially solid but remains fusible. These sheets may then be superposed and pressed together and the laminated product cured. Other products such as leather, wood, felted fibrous bases, etc. may be impregnated in a similar manner with or without lamination.

The polymers which we have prepared are also capable of being used as lacquers or other coating compositions, molded articles, safety glass, etc. Where the composition is used for coating, it may be applied as partially polymerized monomer, or a concentrate of fusible polymer in solution or in solid form, either alone or in combination with natural or synthetic drying oils or resins and the like, the solvent removed and the coated article baked to render the surface infusible.

In accordance with a further modification, the monomeric compound may be polymerized directly to form cast polymers. By this method the monomer is polymerized to form a solid gel which in many cases is flexible and deformable while being insoluble or only partially soluble. Thus, a solid transparent gel sheet may be prepared which comprises a mixture of soluble and insoluble polymer together with more or less monomer. This gel may be molded or shaped to a desired form and further polymerized to a final state of polymerization.

In order to minimize the formation of cracked polymers in such a process, it is found desirable to conduct polymerization processes in a series of stages. Generally, the initial polymerization is carried out by introducing the monomer or a syrupy polymer into a mold and polymerizing in the mold to a stage at which the polymer initially becomes a solid gel before the polymer becomes infusible. In this state the polymer is found to be extremely flexible and is capable of being bent into various shapes. Care in handling such polymers is required, however, since it is generally comparatively weak and often tears readily upon subjection of the product to substantial tension or shearing strain.

The polymer thus formed generally adheres to the mold to some degree and may be under some tension. Generally, this polymer is released from the mold surface in order to permit it to shrink, thus relieving strains which might otherwise remain in the polymer after further polymerization. Thereafter, the product may, if desired, be coated with a lubricant or with monomer or syrupy polymer and further polymerized between smooth plates. The temperature of initial polymerization in such a process should be carefully regulated in order to prevent decomposition of all of the peroxide or other catalyst, and, generally, a temperature of 80° C. or below, is utilized for the initial stage of polymerization. To inhibit formation of cracks during such initial polymerization, it is often desired to substantially minimize polymerization on one side of a sheet while polymerizing the other. In such a case the flexible polymer so produced may be somewhat tacky on one side. This may be done by conducting the polymerization leaving one surface thereof exposed to air or other polymerization inhibitor.

In accordance with a further modification, the soft insoluble gel described above may be used as a molding powder. For example, the monomer may be polymerized to form an insoluble gel which has not been completely converted to the infusible state. Thereafter, the gel may be pulverized or disintegrated and the resulting powder molded, generally with addition of catalyst to a desired shape and further cured to a substantially infusible state.

It is also possible to produce a molding powder by emulsifying the monomer or a syrupy polymer in an aqueous medium containing a suitable emulsification agent such as polyvinyl alcohol, polyallyl alcohol, polymethallyl alcohol, etc. and polymerizing, interrupting polymerization before the gel is obtained or shortly thereafter. This polymer may then be separated from the emulsion and used as a molding powder or the emulsion itself may be used as a coating composition.

The following examples are illustrative:

Example I 1.2 moles of vinyl chloracetate were slowly added over a period of two hours, to one mole of mono-sodium allyl phthalate containing a small quantity of hydroquinone while heating to a temperature of about 75 to 95° C. The reaction mixture was washed with water, then with aqueous sodium carbonate solution until the solution is faintly alkaline. The product, allyl phthalyl vinyl glycolate, was a high-boiling, viscous, colorless liquid. Upon heating this liquid in the presence of 5 percent of benzoyl peroxide, a transparent polymer was secured.

Example II 12.1 parts by weight of allyl chloroformate was slowly added over a period of two hours, to 16.4 parts by weight of castor oil in the presence of a large excess of pyridine while the temperature was maintained at 5 to 10° C. The product was washed successively with water, dilute hydrochloric acid and then with water. Thereafter, the product was heated to 100° C. to remove volatile impurities. The product obtained was a liquid which was soluble in petroleum ether.

Example III 36 moles of phosgene was passed into 40 moles of allyl alcohol. The reaction mass was stirred continuously and maintained between the temperatures of 15 and 25° C. The reaction product was washed in cold water, dried over anhydrous calcium chloride, and purified by distillation. The allyl chloroformate boiled at 46–51° C. at 80 mm. pressure and had a density $(d_4^{20})$ of 1.136.

365 parts by weight of allyl chloroformate was added over a period of 2½ hours to 357 parts by weight of allyl lactate dispersed in 268 cc. of pyridine with stirring at a temperature maintained between 2 and 18° C. The reaction mixture was acidified to the methyl orange end point, washed with water, dilute HCl, dilute Na₂CO₃ solution, and finally again with water. The new compound was dried over anhydrous sodium carbonate and purified by distillation. The product, an ester of allyl acid carbonate and allyl lactate, boiled at 112° C. at 2 mm. of pressure had an index of refraction $(n_D^{20})$ of 1.438 and a density $(d_4^{20})$ of 1.064. The formula of this compound probably is as follows:

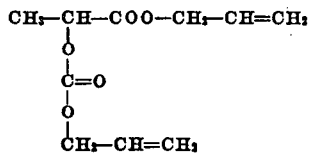

Example IV

The ester of allyl acid carbonate and allyl lactate was polymerized to the fusible state by heating over an oil bath at a temperature of 150° C. while bubbling a stream of air through the monomer. After about 3 hours the viscosity of the polymerizing ester had increased noticeably. The fusible polymer was then precipitated by adding methanol and recovered.

The fusible polymer of Example I was mixed with 1 percent benzoyl peroxide and molded in a press under 2000 pounds per square inch pressure for 30 minutes at a temperature of 145° C. The resulting product was a colorless solid resin.

Example V

The ester of allyl acid carbonate and allyl lactate was mixed with 5 percent benzoyl peroxide and polymerized to the fusible polymer state by heating at 85° C. for 80 minutes. A 100 percent increase was noted in the viscosity. The fusible polymer was precipitated with methyl alcohol and recovered.

A sample of the fusible polymer thus prepared was mixed with 5 percent benzoyl peroxide and pressed in a mold at 145° C. at 2000 pounds per square inch. A transparent and nearly colorless resin was obtained.

Example VI

Methallyl chloroformate was prepared by passing 20 moles of phosgene into 24 moles of methallyl alcohol. The reaction mass was continually agitated and maintained at a temperature between 0–15° C. The product was washed free of alcohol and dried. The methallyl chloroformate boiled at 126–136° C. at atmospheric pressure, had an index of refraction $(n_D^{20})$ of 1.427 and a density of $(d_4^{20})$ 1.070.

453 gms. of methallyl lactate was mixed with 298 gms. of pyridine in a reaction vessel equipped with a stirring device. To this 464 gms. of methallyl chloroformate was slowly added while the reaction mass was maintained between 10 and 20° C. The product was washed with water and heated at 95–100° C. in the presence of activated charcoal and at a total pressure of 15–20 mm. whereby most of the impurities were removed. After the carbon was removed by filtration, the methallyl acid carbonate ester of methallyl lactate was obtained as a clear, colorless liquid having a density $(d_4^{20})$ of 1.058 and an index of refraction $(n_D^{20})$ of 1.445. This compound has the following probable formula:

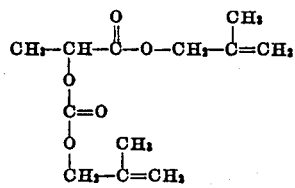

The compound may be polymerized in accordance with the procedure described in Examples IV and V.

Example VII

The process described in Example III was repeated using vinyl lactate in lieu of allyl lactate and a high boiling colorless liquid was secured.

Example VIII

Allyl phthallyl vinyl glycolate was prepared as in Example I and polymerized by the method described in Example V, and a fusible polymer was secured which upon heating with 2 percent benzoyl peroxide polymerized to a substantially infusible state.

Example IX

The process of Example I was repeated using allyl chloracetate in lieu of vinyl chloracetate and allyl phthallyl allyl glycolate, a high boiling clear liquid being secured. This product polymerized upon heating to 80° C. in the presence of 5 percent benzoyl peroxide for several hours to form transparent polymers.

Example X

Approximately equal molecular quantities of allyl lactate and phthalic anhydride were heated together at a temperature of 80° C. to form the corresponding mono ester of phthalic acid. Thereafter, the ester was dried and 0.7 part by weight of mercuric oxide and 0.12 part by weight of boron trifluoride per 100 parts by weight of the phthalate ester were added and acetylene was introduced into this mixture at a temperature of 80° C. for several hours. After absorption of acetylene was complete, the mixture was neutralized with sodium carbonate and the ester washed with dilute alkali and then with water and dried by means of sodium sulphate. The ester was a colorless, high boiling liquid having the following probable formula:

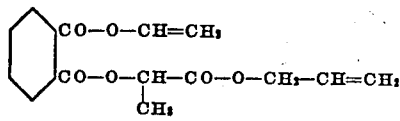

The compound polymerized upon heating to 80° C. in the presence of benzoyl peroxide.

*Example XI*

200 parts by weight of potassium allyl succinate and 160 parts of allyl chloroacetate and 150 parts by weight of allyl alcohol were refluxed for 8 hours. Thereafter, the reaction mixture was filtered and distilled to remove excess allyl alcohol and unreacted allyl chloroacetate. The residue was washed with water and dried over anhydrous sodium sulphate. The product thus obtained was a clear, substantially colorless high boiling liquid having the probable formula:

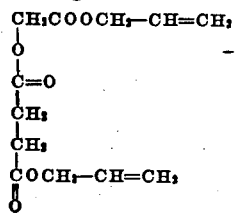

Upon heating this liquid in the presence of 5 percent benzoyl peroxide at a temperature of 80° C., the compound polymerized to form a transparent polymer.

Although the present invention has been described with reference to the specific details of certain embodiments thereof, it is not intended that such details shall be regarded as limitations upon the scope of the invention, except insofar as included in the accompanying claims.

This application is a continuation-in-part of copending application Serial No. 361,280, filed October 15, 1940.

We claim:

1. A polymer of an ester of (a) allyl glycolate and (b) allyl acid phthalate.
2. An ester of (a) allyl glycolate and (b) allyl acid phthalate.
3. Methallyl phthalyl methallyl glycolate.
4. A polymer of methallyl phthalyl methallyl glycolate.
5. As a new compound an allyl carballyloxyalkyl phthalate.
6. A neutral ester having a structural formula:

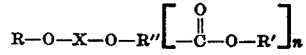

wherein R and R' are radicals selected from the group consisting of radicals corresponding to the radical R in the alcohols designated by the formula ROH, said alcohols being unsaturated monohydric alcohols having from 2–10 carbon atoms and a carbon to carbon unsaturated linkage in an aliphatic chain adjacent the beta carbon atom therein, R'' is a hydrocarbon radical having a valence equal to $(n+1)$, n is a small whole number and X is a radical of the group consisting of

wherein R''' is a divalent hydrocarbon radical.

7. A polymer of the compound described in claim 6.
8. A polymer of the compound described in claim 5.

IRVING E. MUSKAT.
FRANKLIN STRAIN.